March 23, 1937.                A. W. VANCE                2,074,496
                       TELEVISION DEFLECTING CIRCUITS
                       Filed Aug. 24, 1934        2 Sheets-Sheet 1

INVENTOR
Arthur W. Vance
BY T. R. Goldsborough
ATTORNEY

March 23, 1937.     A. W. VANCE     2,074,496
TELEVISION DEFLECTING CIRCUITS
Filed Aug. 24, 1934     2 Sheets-Sheet 2
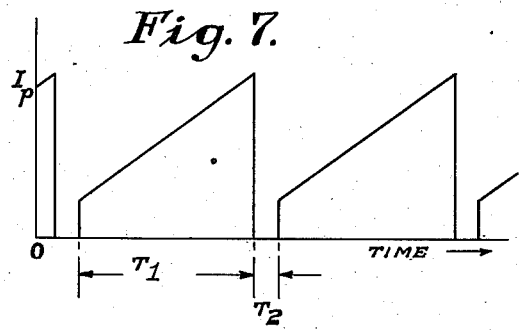
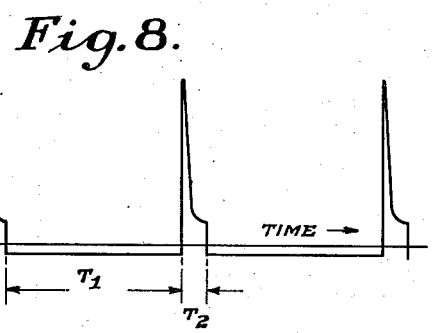
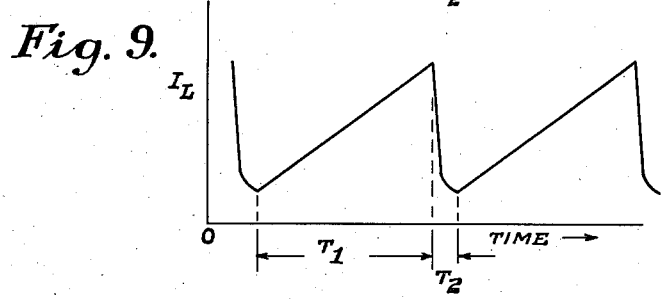
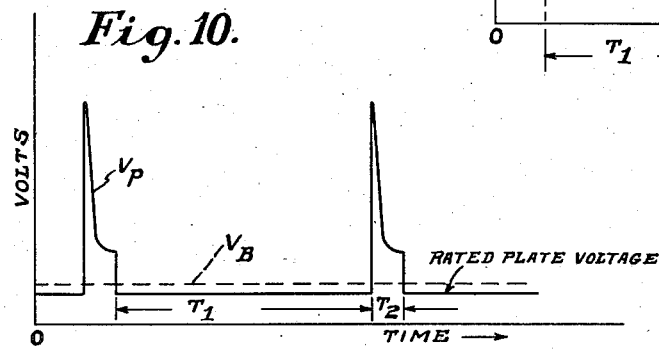
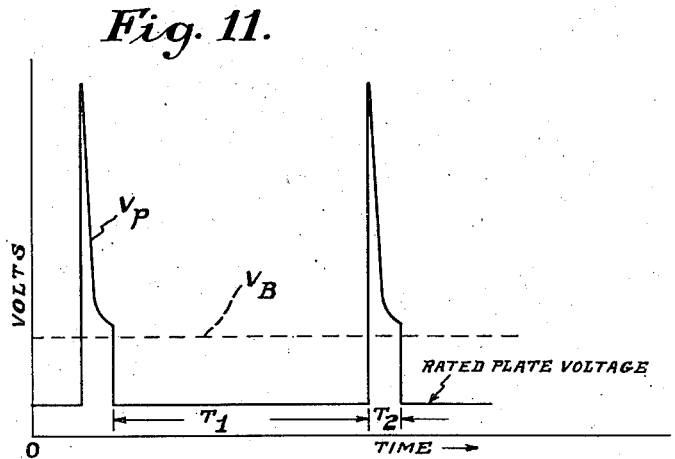
INVENTOR
*Arthur W. Vance*
BY
ATTORNEY Patented Mar. 23, 1937

2,074,496

UNITED STATES PATENT OFFICE 2,074,496

TELEVISION DEFLECTING CIRCUITS

Arthur W. Vance, Philadelphia, Pa., assignor, by mesne assignments, to Radio Corporation of America, New York, N. Y., a corporation of Delaware Application August 24, 1934, Serial No. 741,230

6 Claims. (Cl. 250—27)

My invention relates to cathode-ray tube deflecting circuits and particularly to circuits for providing electro-magnetic deflection of an electron beam.

In apparatus, such as television receivers, having a cathode-ray tube provided with deflecting coils, it has been the usual practice to connect the deflecting coils in the plate circuit of an electric discharge tube, such as a three element vacuum tube, and to operate the circuit in such a manner that during one period current flows through the tube and through the coil to store energy therein and during the next period the coil discharges its energy through the tube. In this way, a saw-tooth wave of current may be forced through the deflecting coils to deflect the electron beam in the cathode-ray tube periodically at a uniform rate across a fluorescent screen.

In order to obtain maximum deflection with an amplifier tube of a given size, the voltage of the amplifier plate battery and the inductance of the deflecting coils are made as great as possible without causing the tube to overheat.

It is an object of my invention to provide an improved deflecting circuit for cathode-ray tubes.

More specifically, it is an object of my invention to obtain greater deflection of an electron beam by a circuit of the above-described type without increasing the size of the amplifier tube.

It is a further object of my invention to provide an improved method for deflecting an electron beam.

In a preferred embodiment of my invention I connect a resistor in shunt to the cathode-ray tube deflecting coil or coils whereby the deflecting coil may discharge through the resistor. The coil is prevented from discharging through the tube by driving the control grid of the amplifier tube negative beyond the cut-off point of the tube. This permits the amplifier tube to cool during the period the deflecting coil is discharging whereby the plate battery voltage and the inductance of the deflecting coil may be further increased.

Other objects, features and advantages of my invention will appear from the following description taken in connection with the accompanying drawings in which Figure 1 is a circuit diagram of a preferred embodiment of my invention;

Figs. 4 to 11 inclusive, are curves which are referred to in explaining the invention.

Figure 1:
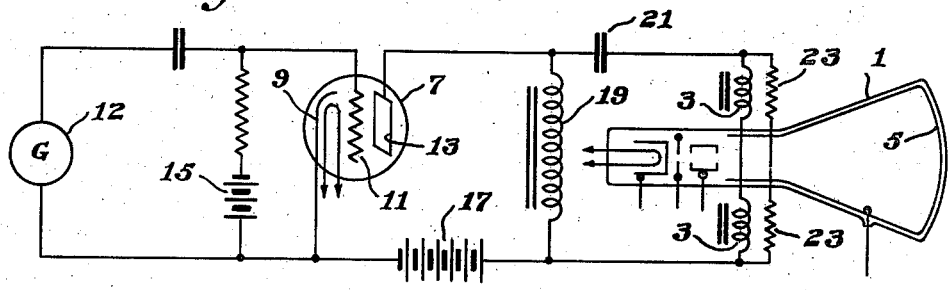

Referring to Fig. 1, a cathode-ray tube is indicated at 1, the tube illustrated being of the general type described in Canadian Patent 343,435, issued July 24, 1934 to V. K. Zworykin. It will be understood, however, that my invention may be applied to a cathode-ray tube of any type.

The cathode-ray tube is provided with deflecting coils 3 through which a current having a saw-tooth wave is passed for sweeping the electron beam in the cathode-ray tube across a fluorescent screen 5 at the end of the tube.

The circuit for producing a flow of saw-tooth current through the deflecting coils 3 includes an electric discharge tube 7, which may be a three electrode vacuum tube having a cathode 9, a control grid 11, and a plate 13. Preferably the vacuum tube is of a type which has a low plate impedance, although this is not an essential feature of my invention. The control grid 11 is maintained at a suitable negative bias by means of any suitable source such as a biasing battery 15.

A control voltage $e_g$ of the character hereinafter described is applied to the control grid 11 by means of a suitable generator indicated at 12. This generator may comprise a vacuum tube network such as described in my copending application Serial No. 544,959, filed June 17, 1931, and assigned to the Radio Corporation of America.

Direct current potential is applied from a source of potential such as a battery 17 through an inductance coil 19, while the deflecting coils 3 are connected across the inductance coil 19 through a blocking condenser 21. In accordance with one feature of my invention, a resistor 23 is connected across the deflecting coils 3 for a purpose which will be explained hereinafter.

In the circuit shown in Fig. 1, unidirectional voltage is applied to the plate 13 through the inductance coil 19 instead of through the deflecting coils 3 in order to avoid an undesired deflection of the electron beam to one side of the fluorescent screen which would be caused by direct current flowing through the deflecting coils.

Figure 2:
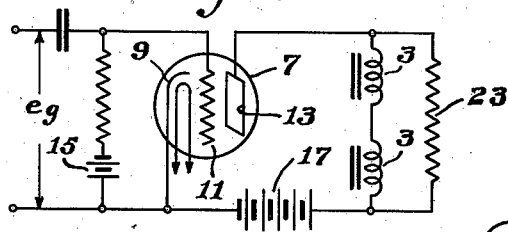
Fig. 2 is a simplified circuit diagram of the apparatus shown in Figure 1.

In Fig. 2, my improved deflecting circuit is shown in simplified form, the circuit being the same as that shown in Fig. 1 except that voltage is applied to the plate 13 through the deflecting coils 3. In the two figures, like parts are indicated by the same reference numerals. Since the simplified circuit of Fig. 2 operates the same as the circuit shown in Fig. 1, it will be referred to in explaining the operation of my invention.

Figure 3:
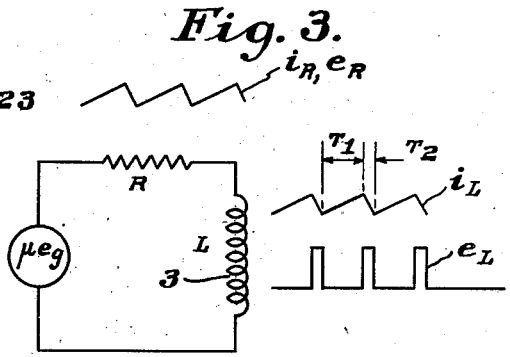
Fig. 3 is an equivalent circuit diagram of the circuit shown in Fig. 2.
Figure 4:
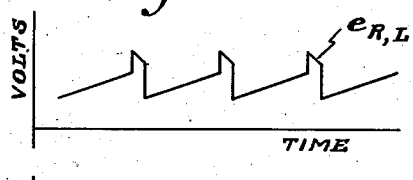
Figure 5:
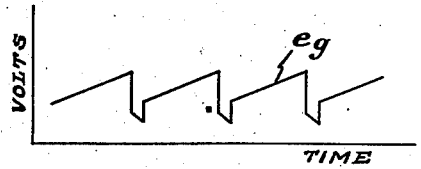
Figure 6:
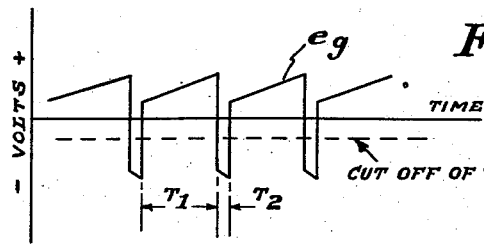

Referring to Fig. 3, there is shown the equivalent circuit diagram for the circuit shown in Fig.

2 with the exception of the resistor 23 shunting the deflecting coils which has been omitted.

In order to explain my invention, the operation of the more conventional type of deflecting circuit, in which the deflecting coil resistor is omitted, will first be described. In Fig. 3, the plate impedance of the vacuum tube is indicated at R, while the inductance of the deflecting coils 3 is indicated at L. The voltage applied to the grid of the vacuum tube 7 appears in its plate circuit as a voltage of the value $\mu e_g$.

In order to produce a saw-tooth wave current indicated at $i_L$ through the inductance L, a square top voltage wave indicated at $e_L$ must be impressed thereacross. The voltage drop across the tube impedance R has the same wave shape as the current, that is, it is a saw-tooth voltage wave as indicated by the curve $i_R$, $e_R$. Therefore, the voltage, which must be impressed upon the circuit R, L to produce the saw-tooth current $i_L$, is the sum of the saw-tooth voltage wave and the square topped voltage wave, this voltage being indicated at $e_{RL}$ in Fig. 4.

The voltage, which must be applied to the grid of the vacuum tube to produce the voltage $e_{RL}$, has the same wave shape but it is 180° out of phase therewith. The grid or input voltage is indicated at $e_g$ in Fig. 5.

In operation the deflecting circuit in the manner described above, the grid of the vacuum tube is never driven so far negative so as to produce plate current cut-off. Obviously, the grid can not be driven to or beyond the cut-off point since the energy stored up in the deflecting coils must discharge through the vacuum tube during the return line period, that is during the period $T_2$ of the saw-tooth current wave $i_L$.

In accordance with my invention, I so operate the deflecting circuit that no current flows through the vacuum tube during the return line period $T_2$. I accomplish this by connecting the resistor 23 across the deflecting coils and by driving the grid of the vacuum tube 7 so negative during the return line period $T_2$ that substantially no current can flow through the tube at the voltage being applied to the plate 13. In other words, during the return line period, the grid of the vacuum tube 7 is driven negative beyond the plate current cut-off point. This is indicated by the curve $e_g$ in Fig. 6 where the negative portion of the curve is shown appearing below the cut-off voltage of the vacuum tube 7. When such a voltage is applied to the input terminals of the vacuum tube 7, the plate current has a characteristic shown in Fig. 7. It will be noted that there is no flow of plate current during the return line period $T_2$.

Instead of discharging through the vacuum tube 7 during the period $T_2$, the deflecting coils 3 discharge through the resistor to produce a flow of current $I_R$ as shown in Fig. 8. It will be evident that current flows through the space discharge path in the tube 7 to store energy in the coils 3 and that this energy is then discharged through the resistors 23.

The flow of current through the deflecting coils is the sum of the current through the vacuum tube 7 and current through the resistor 23, this resultant current having the wave shape shown in Fig. 9. It may be noted that the peculiar form of the curve during the time $T_2$ is caused by the logarithmic discharge curve showing the decay of current in a circuit of resistance and inductance connected in series with a battery when the battery is shorted.

The voltage which is impressed upon the plate 13 of the vacuum tube 7 when the deflecting circuit is operated as described above, is shown by the curve in Fig. 10. In this figure, the battery voltage is indicated by the dotted line $V_B$ while the voltage impressed upon the anode is indicated by the solid line curve $V_P$. These curves represent the operation of the deflecting circuit where the deflecting coils 3 are shunted by the resistor 23 and the control grid is driven negative beyond the cut-off point as described above but where the voltage of the plate battery 17 and the inductance of the deflecting coils 3 have not been increased. With the circuit operated in this manner, there would be no increase in the amount of deflection obtained.

In order to take advantage of my invention, the plate battery voltage is increased as indicated by the dotted line $V_B$ in Fig. 11 and the inductance of the deflecting coils 3 is increased by an amount sufficient to prevent more than rated voltage from being applied to the plate 13 of the vacuum tube 7 during the time $T_1$. It will be obvious that the greater the inductance of the deflecting coils 3 the greater the voltage induced in them for opposing the plate battery voltage. It will also be apparent that by increasing the number of turns in the deflecting coils 3, the amount of deflection obtained is increased.

It will be noted that the voltage applied to the vacuum tube plate 13 during the time $T_2$ is very high. This is not objectionable, however, because, during this time, the control grid 11 is so highly negative that substantially no plate current flows. As a result, the vacuum tube 7 has the time $T_2$ in which to cool.

From the foregoing description, it will be apparent that, by utilizing my invention, greater deflection of an electron beam may be obtained with a given size vacuum tube without causing it to overheat than is possible with previously known circuits. While it is preferable to connect a resistor unit across the deflecting coils for providing the desired discharge path, the resistance may be included in the deflecting coils themselves by so designing them that they have a high dielectric loss.

It will be understood that various other modifications may be made in my invention and I desire, therefore, that only such limitations shall be placed thereon as are necessitated by the prior art and set forth in the appended claims.

I claim as my invention:

1. In a cathode-ray tube deflecting circuit in which a deflecting coil is connected to be supplied with energy through an electric discharge tube and in which a resistive path is associated with said coil, the method which comprises supplying said coil with energy through said tube and periodically biasing said electric discharge tube substantially beyond the cut-off point and simultaneously discharging the energy stored in said coil through said resistive path.

2. The method of deflecting an electron beam in a cathode-ray tube which has a deflecting coil shunted by a resistor and connected in the output circuit of an electric discharge tube which comprises periodically biasing said electric discharge tube substantially beyond plate current cut-off whereby energy stored in said coil discharges through said resistor instead of through said electric discharge tube.

3. In apparatus including a cathode-ray tube having a deflecting coil connected to be supplied with energy from an electric discharge tube and also including a resistive path associated with said coil, the method of deflecting an electron beam in said cathode-ray tube which comprises storing energy in said coil through a space discharge path in said tube and discharging said stored energy through said resistive path substantially to the exclusion of said space discharge path.

4. In combination, a cathode-ray tube having at least one deflecting coil, an electric discharge tube having an input circuit and an output circuit, a source of potential in said output circuit, said deflecting coil being connected in said output circuit, means for providing resistance effectively in shunt to said coil, and means for biasing said electric discharge tube periodically beyond the cut-off point.

5. In combination, a cathode-ray tube having a deflecting coil, an electric discharge tube having a control electrode, means for supplying electrical energy to said coil through said electric discharge tube, and means for absorbing the stored energy in said coil in response to said control electrode being biased substantially beyond the plate current cut-off point of the tube.

6. Apparatus according to claim 5 characterized in that said last means comprises a resistor connected in shunt to said deflecting coil.

ARTHUR W. VANCE.

Disclaimer 2,074,496.—*Arthur W. Vance*, Philadelphia, Pa. TELEVISION DEFLECTING CIRCUITS. Patent dated Mar. 23, 1937. Disclaimer filed Feb. 2, 1950, by the assignee, *Radio Corporation of America*.

Hereby enters this disclaimer to claims 1 to 6, inclusive, of said patent.

[*Official Gazette March 7, 1950.*]